(12) United States Patent
Selwa et al.

(10) Patent No.: US 10,273,021 B1
(45) Date of Patent: Apr. 30, 2019

(54) AUTOMATED SELF-TESTING

(71) Applicant: Kitty Hawk Corporation, Mountain View, CA (US)

(72) Inventors: Alexander David Selwa, Mountain View, CA (US); Mark Johnson Cutler, Sunnyvale, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 16/016,009

(22) Filed: Jun. 22, 2018

(51) Int. Cl.
*B64D 45/00* (2006.01)
*G07C 5/00* (2006.01)
*G07C 5/08* (2006.01)
*G05D 1/08* (2006.01)

(52) U.S. Cl.
CPC ............ *B64D 45/00* (2013.01); *G07C 5/008* (2013.01); *G07C 5/0808* (2013.01); *B64D 2045/0085* (2013.01); *G05D 1/0816* (2013.01)

(58) Field of Classification Search
CPC ............ B64D 45/00; B64D 2045/0085; B64C 2201/00; B64C 2201/024; B64C 2201/088; B64C 2201/108; B64C 2201/141; B64C 2201/145; B64C 13/44; B64C 29/00; G07C 5/0808; G05D 1/101; G05D 1/102; G05D 1/0816; G05D 1/0833; G05D 1/0858
See application file for complete search history.

(56) References Cited

U.S. PATENT DOCUMENTS

| | | | | |
|---|---|---|---|---|
| 2,350,751 A | * | 6/1944 | Gliubich | B64C 13/00 244/182 |
| 2009/0228161 A1 | * | 9/2009 | Botargues | G05D 1/0055 701/11 |
| 2011/0264314 A1 | * | 10/2011 | Parras | G05D 1/0676 701/16 |
| 2013/0006512 A1 | * | 1/2013 | Saggio, III | G08G 5/0013 701/120 |
| 2015/0205301 A1 | * | 7/2015 | Gilmore | G05D 1/101 701/11 |
| 2015/0254988 A1 | * | 9/2015 | Wang | G05D 1/0214 701/3 |
| 2015/0336671 A1 | * | 11/2015 | Winn | B64C 39/024 701/3 |
| 2016/0026188 A1 | * | 1/2016 | Lanterna | G05D 1/0607 701/5 |
| 2016/0114888 A1 | * | 4/2016 | Downey | B64C 39/024 701/2 |
| 2016/0244187 A1 | * | 8/2016 | Byers | B64C 39/024 |
| 2016/0246304 A1 | * | 8/2016 | Canoy | G05D 1/0816 |
| 2016/0284221 A1 | * | 9/2016 | Hinkle | G08G 5/0034 |
| 2016/0342159 A1 | * | 11/2016 | Lanterna | G05D 1/042 |

(Continued)

OTHER PUBLICATIONS

Apetre et al., "Innovative Methods to Estimate Rotorcraft Gross Weight and Center of Gravity," 2012, 6th European Workshop on Structural Health Monitoring.*

*Primary Examiner* — Thomas G Black
*Assistant Examiner* — Sara J Lewandroski
(74) *Attorney, Agent, or Firm* — Van Pelt, Yi & James LLP

(57) ABSTRACT

A flight-time variable associated with an aircraft is determined including by determining the flight-time variable while the aircraft is flying. It is determined whether the aircraft is airworthy based at least in part on the flight-time variable. In response to determining that the aircraft is not airworthy, the aircraft is automatically landed.

22 Claims, 11 Drawing Sheets

(56) References Cited

U.S. PATENT DOCUMENTS

| | | | |
|---|---|---|---|
| 2016/0355257 A1* | 12/2016 | Chappell | B64C 39/024 |
| 2017/0021946 A1* | 1/2017 | Weller | G06F 11/00 |
| 2017/0069214 A1* | 3/2017 | Dupray | G08G 5/0021 |
| 2017/0116617 A1* | 4/2017 | Nance | G01G 19/07 |
| 2017/0233097 A1* | 8/2017 | Chang | B64C 39/024 |
| | | | 701/3 |
| 2017/0259941 A1* | 9/2017 | Briggs, IV | B64F 3/02 |
| 2017/0278406 A1* | 9/2017 | Akselrod | G08G 5/0039 |
| 2018/0095459 A1* | 4/2018 | Bachrach | G05D 1/0016 |
| 2018/0107210 A1* | 4/2018 | Harnett | G05D 1/0038 |
| 2018/0239350 A1* | 8/2018 | Cantrell | G05D 1/0022 |

\* cited by examiner

US 10,273,021 B1

AUTOMATED SELF-TESTING

BACKGROUND OF THE INVENTION

New types of ultralight aircraft are being developed for use by inexperienced pilots. Traditionally, a pilot does a preflight check of the aircraft (e.g., checking that the instruments work, a visual inspection of the exterior, etc.) but inexperienced pilots (e.g., without much training) will not know what to look for. To further add to the problem, ultralight aircraft require some checks which are not as important or necessary with heavier aircraft (e.g., where the payload weight is a relatively small fraction of the total weight of the occupied aircraft). New automated self-testing techniques would be desirable because they permit inexperienced pilots to fly an aircraft without having to learn how to perform preflight checks.

BRIEF DESCRIPTION OF THE DRAWINGS

Various embodiments of the invention are disclosed in the following detailed description and the accompanying drawings.

DETAILED DESCRIPTION

Figure 1:
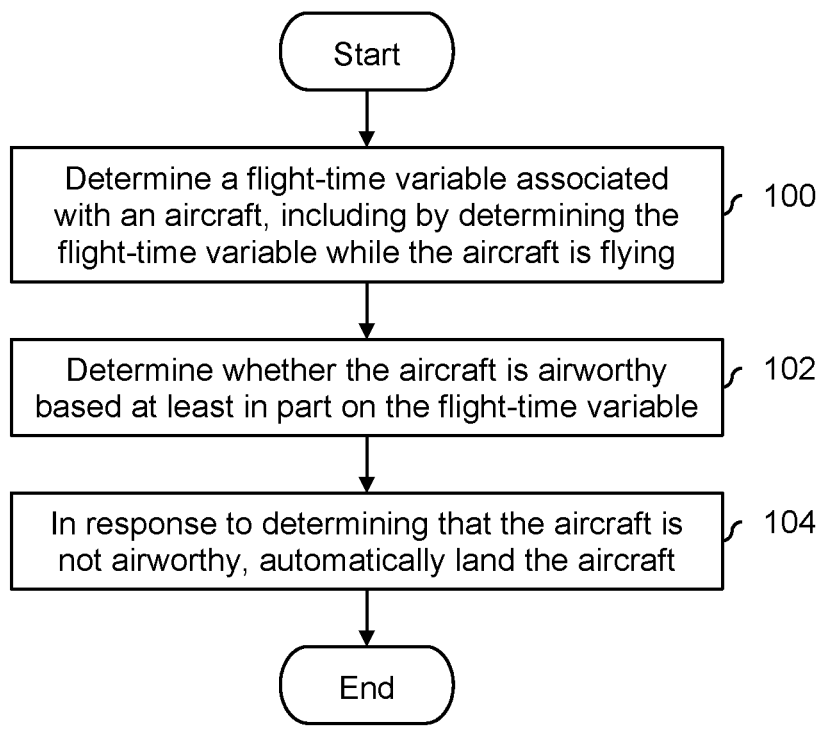
FIG. 1 is a flowchart illustrating an embodiment of a process to determine whether an aircraft is airworthy using a flight-time variable.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of an automated self-testing technique are described herein. In some embodiments, the process includes determining a flight-time variable associated with an aircraft, including by flying the aircraft and determining the flight-time variable while the aircraft is flying, determining whether the aircraft is airworthy based at least in part on the flight-time variable, and in response to determining that the aircraft is not airworthy, automatically landing the aircraft. In some embodiments, the process is performed by an ultralight aircraft (e.g., a flight controller or flight computer in the aircraft). As will be described in more detail below, in some embodiments, due to the strict weight restrictions on ultralight aircraft (e.g., to comply with FAA Part 103, a powered ultralight must weigh less than 254 pounds when empty, excluding any floats and/or safety devices), the flight-time variable or property is determined using existing and/or multi-purpose equipment on the aircraft so that new equipment does not need to be added. For example, since the flight-time property is determined during flight, in some embodiments the thrusts output by various rotors or propellers on the aircraft are analyzed and used to estimate the flight-time property.

FIG. 1 is a flowchart illustrating an embodiment of a process to determine whether an aircraft is airworthy using a flight-time variable. In some embodiments, the process is performed by an ultralight vehicle and/or an aircraft which is piloted by a relatively inexperienced pilot. For example, an inexperienced pilot may not know how to conduct a preflight check of the aircraft or other safety related best practices.

At 100, a flight-time variable associated with an aircraft is determined, including by determining the flight-time variable while the aircraft is flying. As used herein, the term flight-time variable refers to some metric, measurement, or parameter which can vary over time and/or on a flight-byflight basis such that its value is not necessarily certain until the flight time. One example of a flight-time variable is a payload-inclusive weight, which is a weight that includes the payload, such as a payload (only) weight (e.g., the weight of the pilot plus any baggage) or the weight of the occupied aircraft (e.g., the weight of the unoccupied aircraft, pilot, and any baggage). Other examples of flight-time variables include the center of mass of the aircraft when occupied (e.g., which depends upon the weight and positioning of the pilot and any baggage), environmental and/or weather information (e.g., an amount of precipitation, a temperature, a wind speed, air density, etc.), a thrust efficacy based on mechanical and/or electrical condition of rotor, motor, and frame, etc.

In some embodiments, the aircraft performs an autonomous takeoff and the flight-time variable is determined at step 100 during such an autonomous takeoff. Takeoffs and landings tend to be the most risky and/or dangerous part of a flight and since the pilot may be inexperienced, one benefit of using an autonomous takeoff process is that it is safer than having the pilot perform the takeoff. Another benefit is that an autonomous takeoff process will perform takeoffs in a more consistent and/or optimal manner, which may produce a better quality estimate of the flight-time variable. For example, an inexperienced pilot may perform a non-optimal takeoff (e.g., jerky, too much thrust, etc.) which may result in the estimation process producing a poor quality flight-time variable.

At 102, it is determined whether the aircraft is airworthy based at least in part on the flight-time variable. For example, if the flight-time variable is a quantity, then there may be some range or threshold of acceptable values for the flight-time variable. If the flight-time variable is outside of the range of acceptable values, then the aircraft is determined to be not airworthy. Some examples of this are described in more detail below.

At 104, in response to determining that the aircraft is not airworthy, the aircraft automatically lands. For example, as described above, in some embodiments, the flight-time variable is determined during an autonomous takeoff process at step 100. In some embodiments, the airworthiness determination at step 102 is performed while the autonomous takeoff process is still running so that if the aircraft needs to land at step 104, the autonomous takeoff process switches to an autonomous landing process (e.g., and the pilot never gets control of or use of the hand controls).

In some embodiments, the airworthiness decision at 102 is non-binary (e.g., the aircraft can be deemed not airworthy, marginally airworthy, or completely airworthy using two thresholds and/or three ranges of values). For example, determining whether the aircraft is airworthy includes comparing the flight-time variable to a first threshold and comparing the flight-time variable to a second threshold where the first threshold is less than the second threshold. In this example, it is determined that the aircraft is marginally airworthy in response to determining that the flight-time variable exceeds the first threshold and does not exceed the second threshold; it is determined that the aircraft is not airworthy in response to determining that the flight-time variable exceeds the second threshold. The aircraft automatically lands in response to determining that the aircraft is not airworthy, including by automatically landing the aircraft in response to determining that the flight-time variable exceeds the second threshold. Furthermore, the aircraft is configured with a set of one or more constrained settings (e.g., a more conservative mode, disabling some features/ capabilities, lower maximums, etc.) in response to determining that the aircraft is marginally airworthy. In this marginally airworthy state, the aircraft is permitted to fly, but in a more conservative mode (e.g., for safety).

In some embodiments, an autonomous takeoff will not terminate or end (e.g., switch from an autonomous takeoff mode to a (semi-)manual flight mode where the pilot controls the aircraft) until the process of FIG. 1 has completed. To put it another way, in some embodiments, the aircraft will not let the pilot guide the aircraft (e.g., the joystick, thumbwheel, and/or any other input device is ignored) until the process of FIG. 1 deems the aircraft airworthy.

The following figures describe an example where the flight-time variable is a payload-inclusive weight and the aircraft will land if the payload (e.g., pilot and any baggage) is too heavy.

Figure 2:
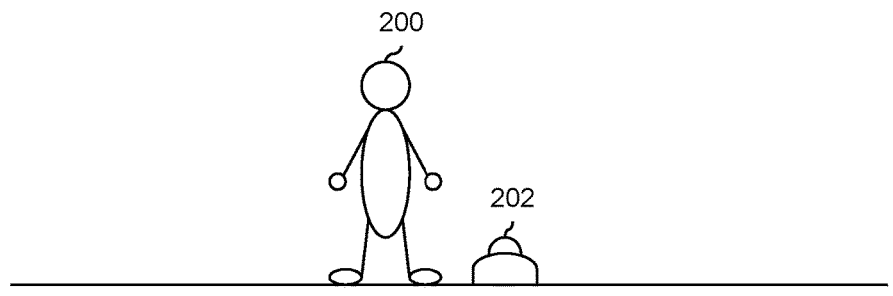
FIG. 2 is a diagram illustrating an embodiment of a pilot and baggage prior to boarding an aircraft.
Figure 2:
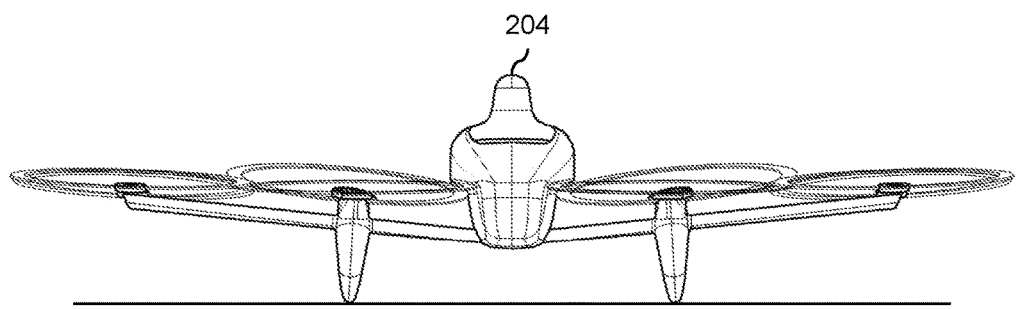

FIG. 2 is a diagram illustrating an embodiment of a pilot and baggage prior to boarding an aircraft. In the example shown, pilot 200 (or, more generally, an occupant) and baggage 202 (or, more generally, freight) will board aircraft 204. In this example, the aircraft (204) is a single-seat ultralight aircraft which, per FAA Part 103, weighs less than 254 pounds empty (excluding any floats and/or safety devices) if powered (which in this example it is). The average weight of an adult American man is 195.7 pounds according to the Centers for Disease Control. This means that for a Part 103 ultralight aircraft, the weight of the pilot (200) and any baggage (202) will greatly affect the performance of the aircraft since the payload weight is such a large percentage of the total weight of the occupied aircraft. As such, one check that the exemplary aircraft automatically performs is an overmass (e.g., overweight) check to ensure that the payload weight does not exceed some threshold (e.g., associated with safe flight). The following figure shows the occupied aircraft (i.e., with the pilot and baggage on board) where a payload-inclusive weight is determined during an automated takeoff process.

As an example of why an overmass situation would not be safe and/or desirable, each of the rotors can only put out so much thrust. A heavier payload eats into the available thrust margin (e.g., the amount of thrust still available, given the current thrust level or amount). Intuitively, with less thrust margin, an aircraft will not be able to respond as quickly and/or as forcefully to certain situations as it would with a lighter payload. In some embodiments, thrust is estimated (i.e., the thrust is not directly measured). In one example, thrust is estimated from combining electrical power, current, and the rotational speed (e.g., RPM) of the rotors with a model or lookup table of the motor/rotor combo.

Figure 3:
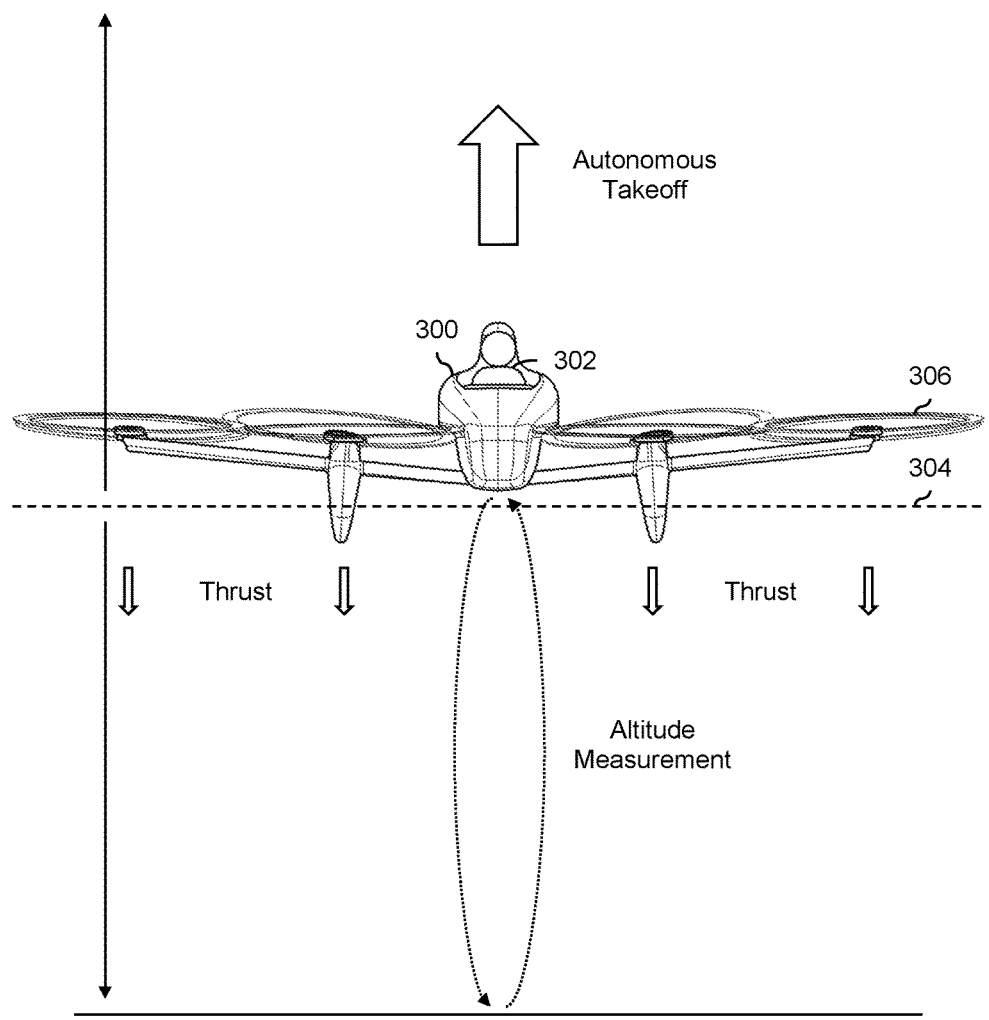
FIG. 3 is a diagram illustrating an embodiment of an occupied aircraft during an autonomous takeoff process.

FIG. 3 is a diagram illustrating an embodiment of an occupied aircraft during an autonomous takeoff process. FIG. 3 continues the example of FIG. 2. In the state shown, the aircraft (300) is occupied and includes a pilot (302) and baggage (not shown). The occupied aircraft is in the process of performing an autonomous takeoff (in this example, a vertical takeoff) where input or guidance from the pilot is not required to perform the takeoff and is in fact ignored.

In some embodiments, the aircraft has an altimeter which does not work below altitude 304 but works above altitude 304. In such embodiments, the aircraft ascends vertically during the autonomous takeoff process until it reaches a height where the altitude of the aircraft can accurately and/or reliably be measured (e.g., at or near altitude 304). Once the aircraft's altitude can be measured (in this binary example), the thrusts associated with each of the aircraft's 10 rotors (306) are obtained at that altitude and are used to estimate the payload-inclusive weight. In this example, the rotors of the aircraft rotate about a substantially vertical axis and the aircraft does not use any wing-borne lift to remain airborne.

Alternatively, the aircraft may have multiple altitude measuring techniques and/or technologies (e.g., a near-field technology or technique for lower altitudes and a far-field technology or techniques for higher altitudes where altitude 304 is at or near the switching point between the two). At an altitude where the aircraft has the best altitude measurement (e.g., of the two techniques available, at least in this example), the thrusts associated with each of the 10 rotors (306) are obtained. As before, the thrusts are used to estimate the payload-inclusive weight (e.g., the weight of the payload alone or the total weight of the occupied aircraft).

From the 10 thrusts associated with the 10 exemplary rotors, the payload-inclusive weight (e.g., just the payload weight or the weight of the occupied aircraft) can be determined. Generally speaking, the rotors output more thrust for a heavier payload and the payload can be determined from the measured thrusts and the known altitude. In some embodiments, a lookup table is used to map the thrusts and altitude to a determined payload weight and/or weight of the occupied aircraft. This can include a ground effect model which improves the accuracy of the weight estimate by considering how the cushion of air below the aircraft reduces the required thrust to hover. In some embodiments, the altitude at which the thrusts are obtained (and which was obtained using the best available altitude measurement technique) is also used to estimate the payload-inclusive weight.

In some embodiments, other factors are also taken into consideration when determining a payload-inclusive weight (e.g., in addition to thrust and/or altitude). For example, if there is a strong wind, the rotors will have to output different amounts of thrust during a takeoff compared to when there is no wind, even if the payload stays the same. As such, in some embodiments, wind speed and direction is taken into consideration when determining a payload-inclusive weight. Other factors which may be taken into consideration during estimation of the payload weight include both air density and temperature. For example, warmer, less dense air will require the rotors to spin faster to produce the same amount of thrust. These factors help determine the effective payload-inclusive weight. In other words, the effective payload-inclusive weight is the maximum weight capable of being flown and that value will change based on wind, temperature, density, etc.

In this example, once the payload-inclusive weight is determined, it is compared against a weight threshold. In one example, it is a binary decision: the payload-inclusive weight is either too heavy (i.e., it exceeds the weight threshold) and the aircraft is forced to land, or the payload-inclusive weight is not too heavy (i.e., it does not exceed the weight threshold) and the aircraft is permitted to fly.

Alternatively, there may be multiple weight ranges and corresponding levels of airworthiness. For example, if the payload-inclusive weight is less than a first, lower weight threshold, then the aircraft is deemed airworthy and is permitted to fly at full capacity and/or in an unrestricted manner.

If the payload-inclusive weight is between the first, lower weight threshold and a second, higher weight threshold (e.g., a "gray zone" where the payload-inclusive weight is on the heavier side and could impede responsiveness and/or performance but is not so heavy that the aircraft should be forced to land), then the aircraft is permitted to fly, but with reduced capacity and/or in a more conservative mode or setting. For example, the heavier payload-inclusive weight may mean that the aircraft cannot stop as quickly and/or turn as quickly. For safety reasons, the aircraft in this gray zone may be automatically configured to have a lower maximum speed and/or permit the pilot less authority with respect to banking, yawing, or other turning or rotating type of movement. This is because with a heavier payload, the aircraft may not be able to turn as tightly, stop as quickly, etc. and the reduced or otherwise constrained maximums or settings will enable the aircraft to fly safely and/or properly, even with the relatively heavy payload.

If the payload-inclusive weight is greater than the second, higher weight threshold, then the aircraft is determined to be not airworthy and the aircraft is forced to land. For example, if this process is performed during an autonomous takeoff process, then the aircraft may switch from an autonomous takeoff process to an autonomous landing process.

Some other types of aircraft use dedicated sensors, such as pressure sensors, to determine or otherwise estimate the payload weight (or, alternatively, the weight of the occupied aircraft). However, this requires the addition of the sensors which add to the weight and cost of the aircraft and the sensors are only used to estimate the payload weight. For ultralight vehicles with very stringent weight limitations, every additional pound and device matters. One benefit to determining the payload weight using the thrusts associated with the rotors is that the sensors and/or measuring devices used (e.g., the altimeter, thrust measurement devices, etc.) are already included in the aircraft so that additional parts or components do not need to be added to the aircraft.

The following figures describe the examples above more generally and formally in flowcharts.

Figure 4:
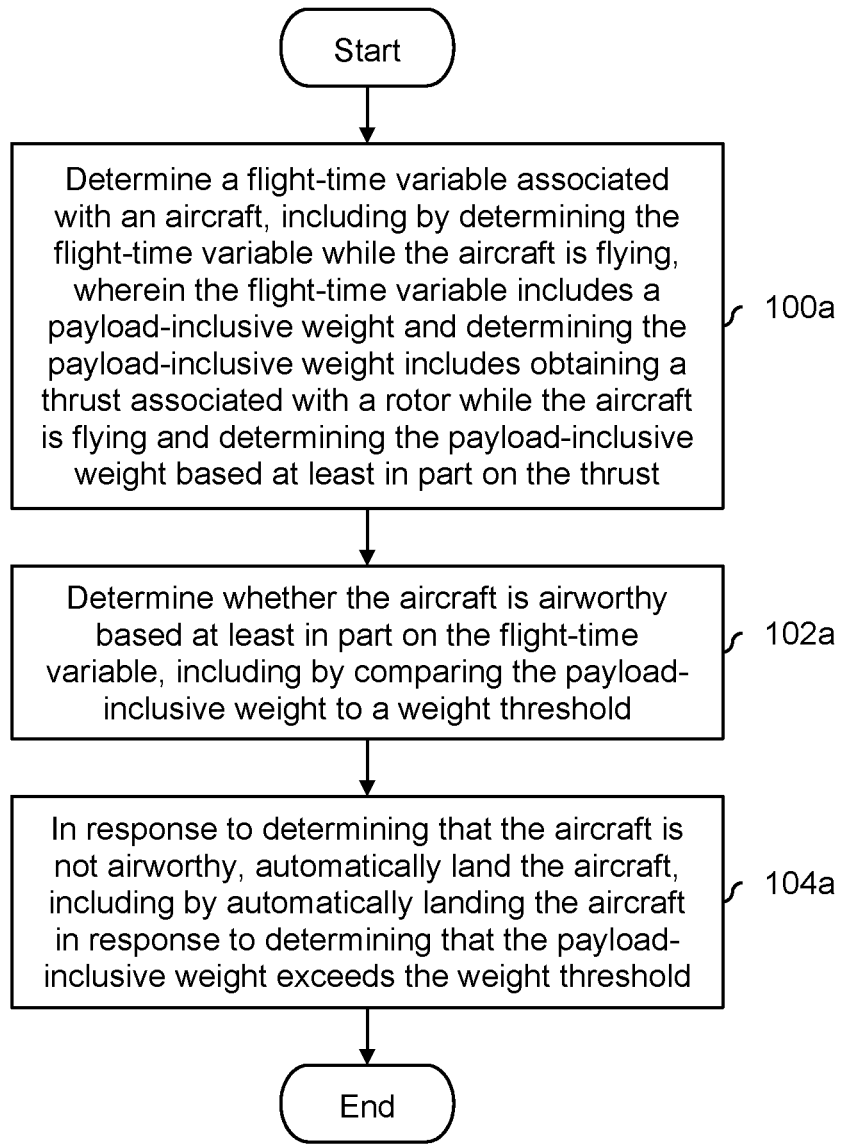
FIG. 4 is a flowchart illustrating an embodiment of a process to determine whether an aircraft is airworthy based at least in part on a payload-inclusive weight.

FIG. 4 is a flowchart illustrating an embodiment of a process to determine whether an aircraft is airworthy based at least in part on a payload-inclusive weight. FIG. 4 is related to FIG. 1 and for convenience the same or similar reference numbers are used to indicate related steps.

At 100a, a flight-time variable associated with an aircraft is determined, including by determining the flight-time variable while the aircraft is flying, wherein the flight-time variable includes a payload-inclusive weight and determining the payload-inclusive weight includes obtaining a thrust associated with a rotor while the aircraft is flying and determining the payload-inclusive weight based at least in part on the thrust. In some embodiments, the payload-inclusive weight is just the weight of the pilot and any baggage (e.g., pilot 200 and baggage 202 in FIG. 2). In some embodiments, the payload-inclusive weight is the weight of the occupied aircraft (e.g., pilot 200, baggage 202, and unoccupied aircraft 204 in FIG. 2).

In one example of step 100a, in FIG. 3, once the aircraft (300) reaches an altitude where the most accurate altitude measurement is available, the thrusts output by the 10 rotors (306) are obtained. From the thrusts, the payload-inclusive weight is determined. In some embodiments, the altitude at which the thrust(s) is/are obtained is also used in determining the payload-inclusive weight. In some embodiments, other factors and/or variables are taken into consideration when determining the payload-inclusive weight.

At 102a, it is determined whether the aircraft is airworthy based at least in part on the flight-time variable, including by comparing the payload-inclusive weight to a weight threshold. For example, if the payload-inclusive weight exceeds the weight threshold, then it is decided that the aircraft is not airworthy. If the payload-inclusive weight does not exceed the weight threshold, then it is decided that the aircraft is airworthy.

At 104a, in response to determining that the aircraft is not airworthy, the aircraft automatically lands, including by automatically landing the aircraft in response to determining that the payload-inclusive weight exceeds the weight threshold. For example, if steps 100a and 102a are performed during an autonomous takeoff process (see, e.g., FIG. 3), then the aircraft may switch from an autonomous takeoff process to an autonomous landing process.

In some embodiments, the aircraft which performs the process of FIG. 4 is a vertical takeoff and landing (VTOL) aircraft, one example of which is shown in FIG. 2 and FIG. 3. Performing an airworthiness check while a VTOL aircraft is taking off may be safer and/or easier to implement than with a conventional takeoff and landing (CTOL) aircraft which uses wing-borne lift to stay airborne. For example, with a CTOL aircraft, if the aircraft is deemed not airworthy after the CTOL has taken off, to autonomously land, the CTOL aircraft would have to circle back, locate the runway, decide if the runway is clear, and then land on the runway, all autonomously. In contrast, with a VTOL aircraft, the landing zone beneath the aircraft will probably remain unoccupied while the VTOL aircraft is taking off and so if the VTOL aircraft needs to autonomously land because the aircraft is deemed not airworthy, the landing zone will still probably be clear. Also, landing vertically in an autonomous manner is a much simpler problem to solve than a conventional landing.

Figure 5:
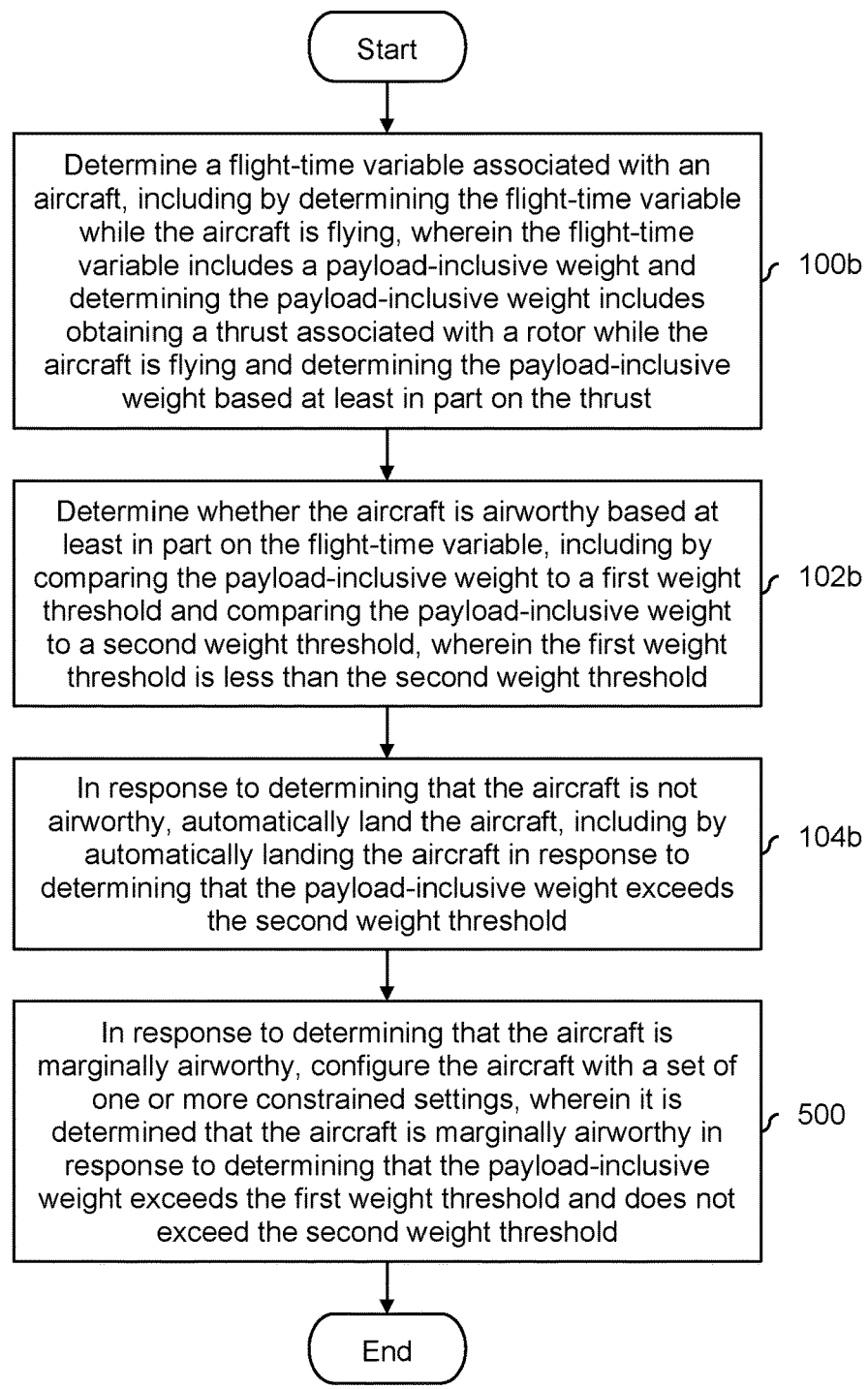
FIG. 5 is a flowchart illustrating an embodiment of a process to determine whether an aircraft is airworthy, including whether the aircraft is marginally airworthy or completely airworthy, based at least in part on a payload-inclusive weight.

FIG. 5 is a flowchart illustrating an embodiment of a process to determine whether an aircraft is airworthy, including whether the aircraft is marginally airworthy or completely airworthy, based at least in part on a payload-inclusive weight. FIG. 5 is related to FIG. 1 and for convenience the same or similar reference numbers are used to indicate related steps.

At 100b, a flight-time variable associated with an aircraft is determined, including by determining the flight-time variable while the aircraft is flying, wherein the flight-time variable includes a payload-inclusive weight and determining the payload-inclusive weight includes obtaining a thrust associated with a rotor while the aircraft is flying and determining the payload-inclusive weight based at least in part on the thrust.

At 102b, it is determined whether the aircraft is airworthy based at least in part on the flight-time variable, including by comparing the payload-inclusive weight to a first weight threshold and comparing the payload-inclusive weight to a second weight threshold, wherein the first weight threshold is less than the second weight threshold. As described above, if the payload-inclusive weight does not exceed the first, lighter weight threshold, then the aircraft is determined to be completely and/or unreservedly airworthy. If the payload-inclusive weight is between the two weight thresholds, then the aircraft is determined to be marginally and/or somewhat airworthy. If the payload-inclusive weight exceeds the second, heavier weight threshold, then the aircraft is determined to be not airworthy.

At 104b, in response to determining that the aircraft is not airworthy, the aircraft automatically lands, including by automatically landing the aircraft in response to determining that the payload-inclusive weight exceeds the second weight threshold. For example, it may be unsafe to fly the aircraft if the payload is too heavy, and this check will ensure that the aircraft automatically lands if this scenario is detected. For example, an autonomous landing process may be initiated and/or the aircraft may ignore whatever the pilot is indicating through the input devices (e.g., a joystick, a thumbwheel, etc.).

At 500, in response to determining that the aircraft is marginally airworthy, the aircraft is configured with a set of one or more constrained settings, wherein it is determined that the aircraft is marginally airworthy in response to determining that the payload-inclusive weight exceeds the first weight threshold and does not exceed the second weight threshold. In this scenario, the aircraft is on the heavier side (e.g., enough so where flying at full capacity could be dangerous or undesirable in some other manner) but not so heavy that the aircraft should not be permitted to fly at all. As such, the aircraft is configured with reduced or constrained settings so that it cannot fly at full capacity (e.g., it is configured to be in a conservative and/or reduced mode). Generally speaking, a constrained setting reduces or otherwise constrains the aircraft, limiting the performance and/or flight capabilities in some manner. For example, a constrained setting may reduce a maximum speed, a maximum attitude, a maximum acceleration, a maximum body rate, etc. that the aircraft is permitted to fly at because the aircraft cannot stop as quickly or turn as tightly as before.

In the third scenario (e.g., the payload-inclusive weight is less than the first, lighter threshold), the aircraft is deemed (e.g., completely and/or unreservedly) airworthy and the aircraft is configured or otherwise permitted to fly at a full and/or unrestricted capacity (e.g., the aircraft is configured or otherwise set with unconstrained and/or full-capacity settings).

In some embodiments, the flight-time variable that is checked is a payload-inclusive center of gravity (e.g., when the aircraft is occupied with a pilot and any baggage). The following figures describe an example of this.

Figure 6A:
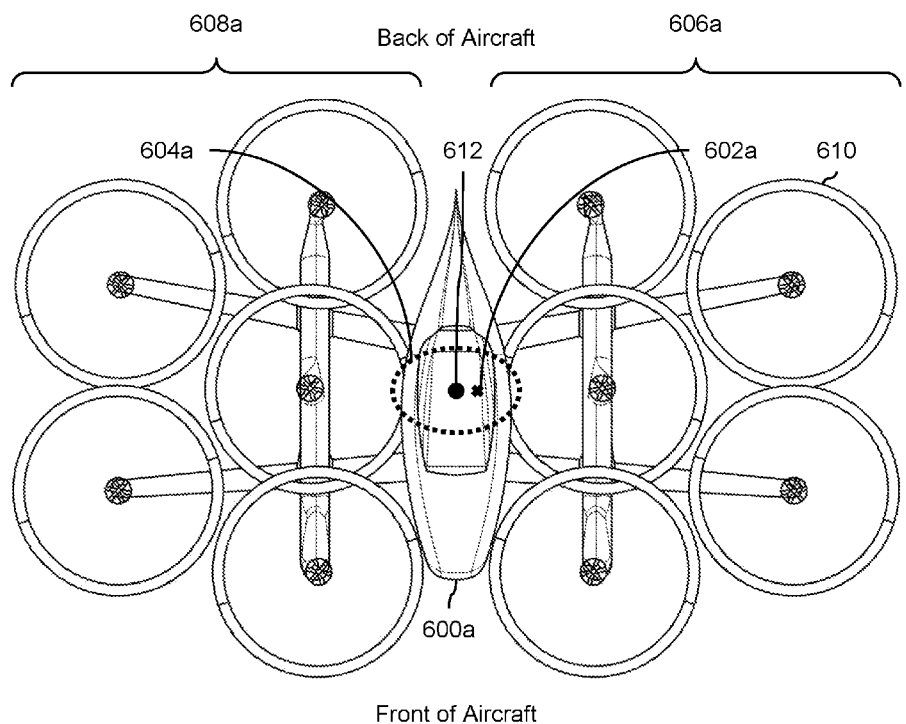
FIG. 6A is a diagram illustrating an embodiment of a top view of an aircraft where a payload-inclusive center of gravity is determined and checked.

FIG. 6A is a diagram illustrating an embodiment of a top view of an aircraft where a payload-inclusive center of gravity is determined and checked. In this example, the 10-rotor aircraft described above is shown from a top view. Although aircraft 600a is occupied and is described as such, to more clearly show center of gravity 602a and threshold 604a, the diagram does not show a pilot nor baggage in the cockpit.

In the example shown, a payload-inclusive center of gravity (602a) is determined, where the payload-inclusive center of gravity is the center of gravity when the aircraft is occupied by the payload, such as a pilot and baggage. As described above, the exemplary aircraft shown here is an ultralight vehicle where the weight of the payload can greatly affect the responsiveness and/or performance of the aircraft because the weight of the unoccupied aircraft and the payload are on the same order of magnitude. To ensure the payload-inclusive center of gravity, once the pilot and any baggage are in the aircraft, the center of gravity is estimated and checked to ensure that it is not too far off from some ideal or expected center of gravity.

In this example, the center of gravity is estimated during takeoff. In some embodiments, as described above, the aircraft waits until it reaches an altitude where an accurate altitude measurement is available (or a most accurate measurement technique is available) and then measures or otherwise obtains the thrust at the now-known altitude. The geometry of the 10 rotors (610) is known so that the center of gravity can be estimated given the 10 thrusts and geometry of the rotors. For example, if the aircraft is level but the rotors on the left side of the aircraft (606a) are outputting more thrust than their counterpart rotors on the right side (608a), then that is indicative of a center of gravity that is left-of-center since the rotors on the left side are working harder to keep that side airborne.

Once the center of gravity has been estimated or otherwise determined, it is compared against a center of gravity threshold. In the example shown here, the threshold (604a)

is represented by a three-dimensional (3D) ellipsoid. If the measured or determined payload-inclusive center of gravity (602a) is within the ellipsoid (604a), as is shown here, then the aircraft is determined to be airworthy. However, if the payload-inclusive center of gravity (602a) is outside of the ellipsoid (604a), not shown here, then the aircraft is determined to be not airworthy and is forced to land.

In some embodiments, not only are there be several "tiers" for a given metric (e.g., full flight, reduced flight, no flight), but the conditions may be completely continuous. For example, there may be a distribution function around a variable of interest (e.g., mass, center of gravity, etc.) where for any given value, a unique set of slight parameters is obtained or otherwise generated, where in the extremes, those flight parameters do not allow the aircraft to take off at all or force an auto-landing. A continuous function may be attractive because it offers a seamless flight experience with no abrupt changes, and the flight parameters at the extreme values make the aircraft safer.

The following figure shows the same diagram from a front view.

Since FIG. 6A shows a top view of all of the rotors, this is a convenient time to describe the aircraft and its operation in more detail. In this example, all of the rotors in a particular column (e.g., going from the front of the multicopter to the rear of the multicopter) have alternating directions of rotation. This alternation may enable the multicopter to fly more efficiently. A rotor creates lift when the blade is traveling against the direction of wind and does not create lift when it spins in the direction of wind. By stacking up alternating rotors one behind the next in the direction of flight (e.g., typically forwards), the multicopter may experience a consistent amount of lift and/or decreased intervals of decreased lift.

TABLE 1

Directions of rotation for the exemplary rotors shown in FIG. 6A.

| Rotor | Direction of Rotation (viewed from above) |
|---|---|
| Right Inner Front Rotor | Counterclockwise |
| Right Outer Front Rotor | Counterclockwise |
| Right Inner Middle Rotor | Clockwise |
| Right Outer Back Rotor | Clockwise |
| Right Inner Back Rotor | Counterclockwise |
| Left Inner Back Rotor | Clockwise |
| Left Outer Back Rotor | Counterclockwise |
| Left Inner Middle Rotor | Counterclockwise |
| Left Outer Front Rotor | Clockwise |
| Left Inner Front Rotor | Clockwise |

The directions of rotations shown here are selected based on a variety of factors. In some embodiments, rotors that are opposite to each other on the aircraft (e.g., where the fuselage is the axis of symmetry) may rotate in opposing directions to balance torque.

Each of the rotors is attached in a fixed manner to the exemplary multicopter with some fixed roll angle and fixed pitch angle. In this example, each rotor's tilt position is described using two angles: a roll angle and a pitch angle. The roll angle is defined by the roll axis, sometimes referred to as an x-axis, where a positive roll angle follows the right-hand direction of rotation and a negative roll angle is in the opposite direction. Similarly, the pitch angle for each rotor is defined by the pitch axis, sometimes referred to as a y-axis, where a positive pitch angle follows the right-hand direction of rotation and a negative pitch angle is in the opposite direction.

The following table lists the roll angle and pitch angle for each rotor in this example. It is noted that opposite rotors (e.g., where the fuselage acts as an axis of symmetry) have roll angles of the same magnitude but opposite signs and the same pitch angle. Generally speaking, the roll angles and pitch angles have magnitudes within the range of 0 degrees and 10 degrees.

TABLE 2

Tilt positions for the exemplary rotors shown in FIG. 6A.

| Rotor | Roll Angle (in degrees) | Pitch Angle (in degrees) |
|---|---|---|
| Right Inner Front Rotor | 3.0 | 0.0 |
| Right Outer Front Rotor | −2.0 | −3.0 |
| Right Inner Middle Rotor | −4.0 | −9.0 |
| Right Outer Back Rotor | −2.0 | −10.0 |
| Right Inner Back Rotor | −7.0 | −2.0 |
| Left Inner Back Rotor | 7.0 | −2.0 |
| Left Outer Back Rotor | 2.0 | −10.0 |
| Left Inner Middle Rotor | 4.0 | −9.0 |
| Left Outer Front Rotor | 2.0 | −3.0 |
| Left Inner Front Rotor | −3.0 | 0.0 |

One benefit of the exemplary multirotor shown here is that it is possible to nearly directly estimate the main body-frame moments on the vehicle (coming from the motor thrusts), leading to a direct calculation of the center of gravity of the vehicle. This is not possible or at least is much harder with some other types of aircraft (e.g., a conventional takeoff and landing aircraft) since there is not the same and/or as much insight into all of the main body moments.

Figure 6B:
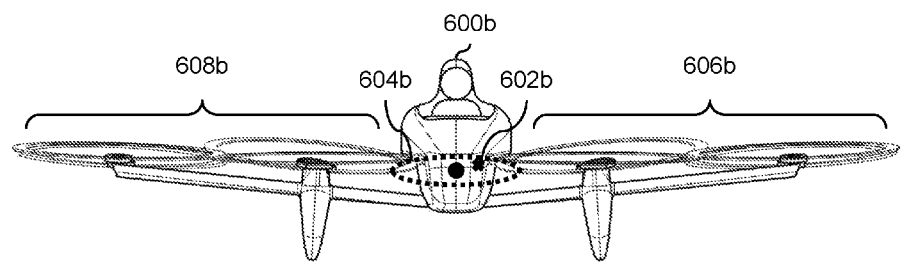
FIG. 6B is a diagram illustrating an embodiment of a front view of an aircraft where a payload-inclusive center of gravity is determined and checked.

FIG. 6B is a diagram illustrating an embodiment of a front view of an aircraft where a payload-inclusive center of gravity is determined and checked. In the example shown, Aircraft 600b is shown from the front with left rotors (606b) and right rotors (608b) shown for reference. As before, ellipsoid 604b represents the threshold against which the measured payload-inclusive center of gravity (602b) is compared.

In the example shown here, a binary airworthiness decision is made: the aircraft either is airworthy or it is not airworthy (which is why only a single threshold or ellipsoid is shown). Similar to the weight example described above, in some embodiments (not shown here) the aircraft is permitted to fly in a restricted, reduced, or otherwise more conservative mode if the center of gravity is in a sort of gray zone. For example, there may be two thresholds represented by two concentric ellipsoids and if the center of gravity is between the two ellipsoids then the aircraft is permitted to fly with reduced settings or in a reduced mode.

The following figures describe these center of gravity examples more formally and/or generally in a flowchart.

Figure 7:
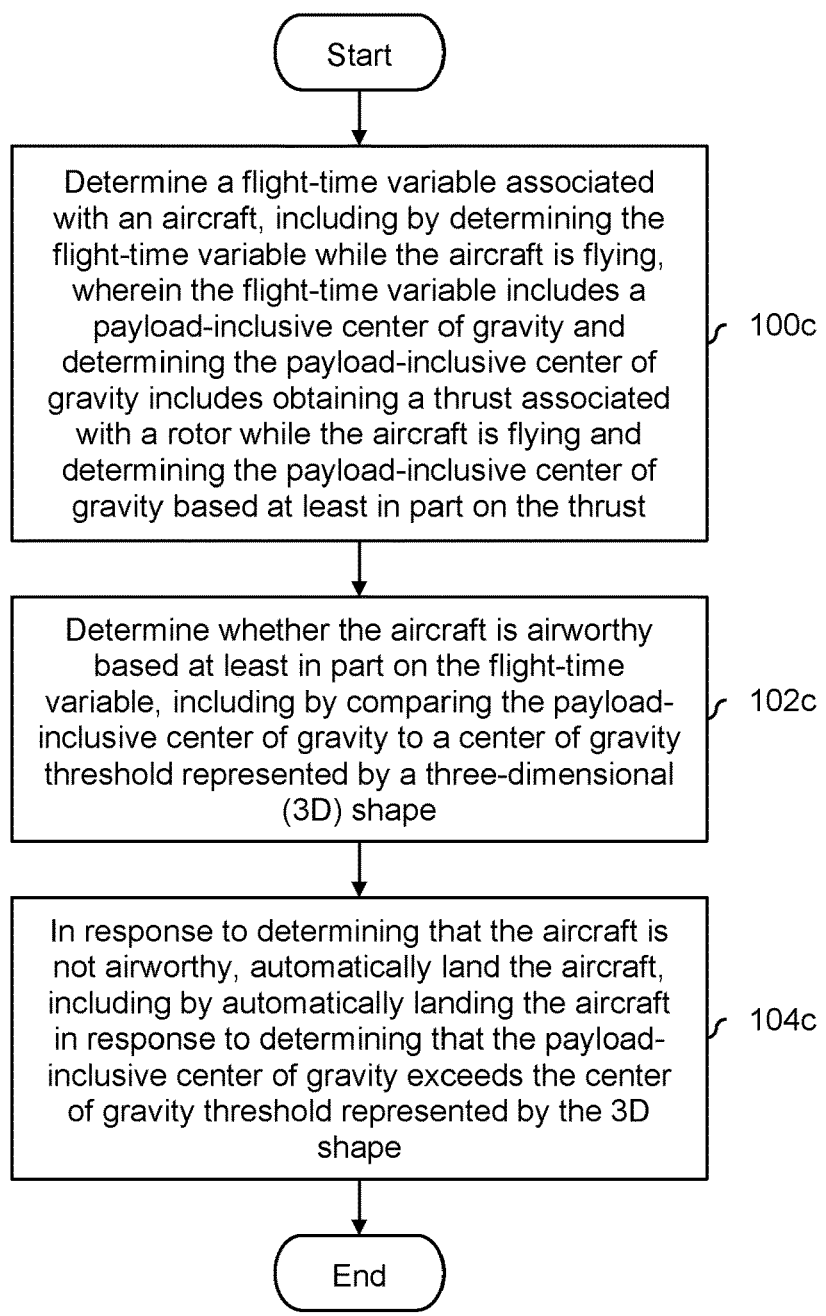
FIG. 7 is a flowchart illustrating an embodiment of a process to determine whether an aircraft is airworthy based at least in part on a payload-inclusive center of gravity.

FIG. 7 is a flowchart illustrating an embodiment of a process to determine whether an aircraft is airworthy based at least in part on a payload-inclusive center of gravity. FIG. 7 is related to FIG. 1 and for convenience the same or similar reference numbers are used to indicate related steps.

At 100c, a flight-time variable associated with an aircraft is determined, including by determining the flight-time variable while the aircraft is flying, wherein the flight-time variable includes a payload-inclusive center of gravity and determining the payload-inclusive center of gravity includes obtaining a thrust associated with a rotor while the aircraft is flying and determining the payload-inclusive center of gravity based at least in part on the thrust. See, for example, FIG. 6A. The thrusts from each of the 10 rotors may be obtained at an altitude (e.g., which is itself measured or otherwise determined) and used to estimate the center of gravity (602a). For example, due to the symmetry of the rotors about the fuselage, if one side is outputting more thrust than the other side, the center of mass is off-center (as shown in FIG. 6A where the X mark (602) shows the occupied center of gravity and the circle (612) shows the ideal or expected center of gravity). From the geometry and/or arrangement of the rotors, plus historic testing, the center of gravity may be determined.

At 102c, it is determined whether the aircraft is airworthy based at least in part on the flight-time variable, including by comparing the payload-inclusive center of gravity to a center of gravity threshold represented by a three-dimensional (3D) shape. For example, in FIG. 6A and FIG. 6B, if the center of gravity (e.g., 602a/602b) is inside of ellipsoid 604a/604b, then the aircraft is determined to be airworthy. If the center of gravity is outside of the ellipsoid in that example, then the aircraft is determined to not be airworthy.

At 104c, in response to determining that the aircraft is not airworthy, the aircraft automatically lands, including by automatically landing the aircraft in response to determining that the payload-inclusive center of gravity exceeds the center of gravity threshold represented by the 3D shape. For example, if steps 100c and 102c are performed during an automated takeoff process, then the automated process may end and an automated landing process may begin.

Figure 8:
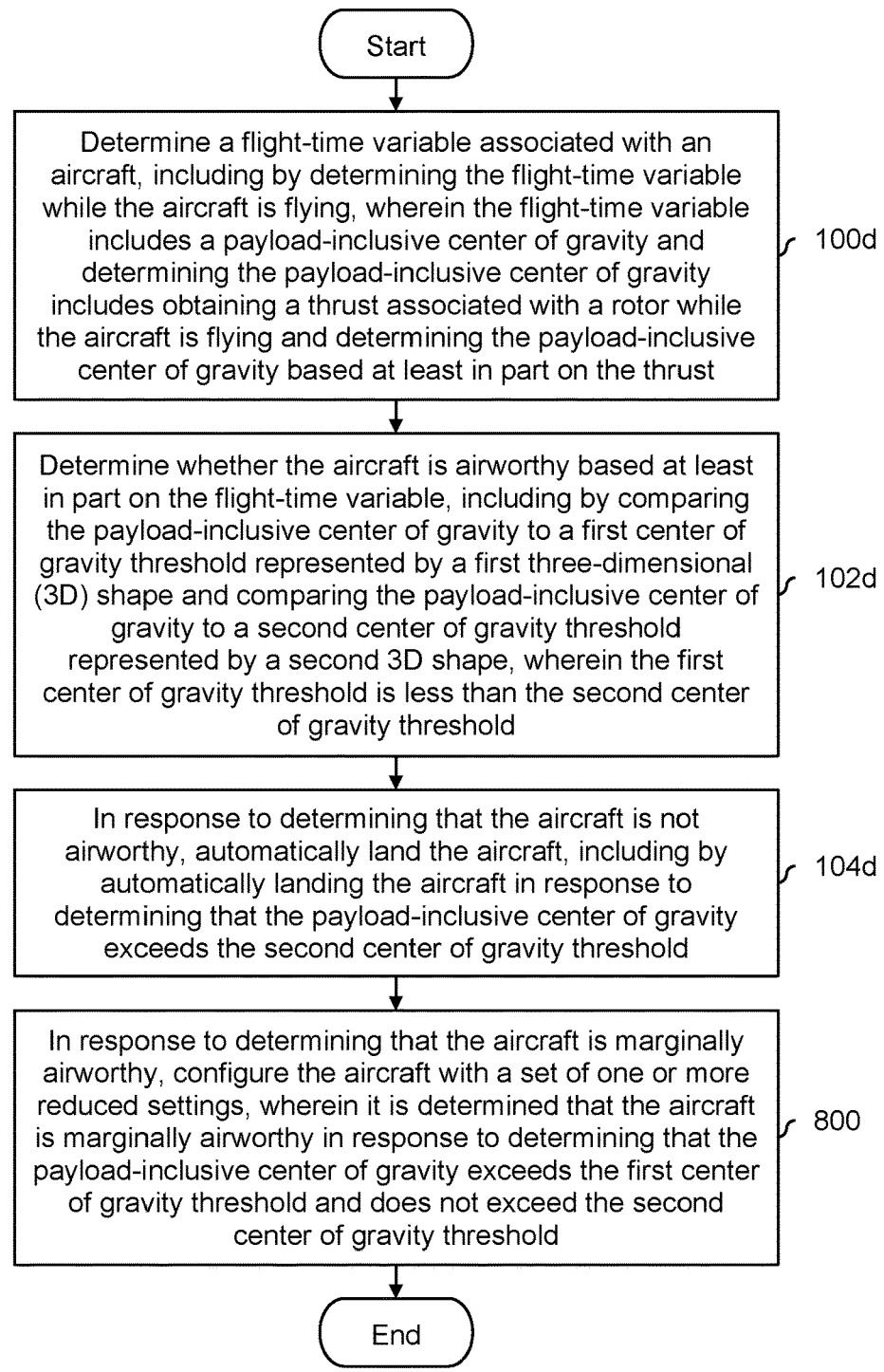
FIG. 8 is a flowchart illustrating an embodiment of a process to determine whether an aircraft is airworthy, including being marginally airworthy or completely airworthy, based at least in part on a payload-inclusive center of gravity.

FIG. 8 is a flowchart illustrating an embodiment of a process to determine whether an aircraft is airworthy, including being marginally airworthy or completely airworthy, based at least in part on a payload-inclusive center of gravity. FIG. 8 is related to FIG. 1 and for convenience the same or similar reference numbers are used to indicate related steps.

At 100d, a flight-time variable associated with an aircraft is determined, including by determining the flight-time variable while the aircraft is flying, wherein the flight-time variable includes a payload-inclusive center of gravity and determining the payload-inclusive center of gravity includes obtaining a thrust associated with a rotor while the aircraft is flying and determining the payload-inclusive center of gravity based at least in part on the thrust. For example, center of gravity 602a and 602b may be determined using the thrusts from the 10 rotors shown in FIG. 6A and FIG. 6B.

At 102d, it is determined whether the aircraft is airworthy based at least in part on the flight-time variable, including by comparing the payload-inclusive center of gravity to a first center of gravity threshold represented by a first three-dimensional (3D) shape and comparing the payload-inclusive center of gravity to a second center of gravity threshold represented by a second 3D shape, wherein the first center of gravity threshold is less than the second center of gravity threshold. For example, although not shown in FIG. 6A and FIG. 6B, in some embodiments, the two center of gravity thresholds are represented by two concentric 3D ellipsoids.

At 104d, in response to determining that the aircraft is not airworthy, the aircraft automatically lands, including by automatically landing the aircraft in response to determining that the payload-inclusive center of gravity exceeds the second center of gravity threshold. For example, the center of gravity may be so far off from center that it is unsafe and/or undesirable to let the aircraft fly.

At 800, in response to determining that the aircraft is marginally airworthy, the aircraft is configured with a set of one or more reduced settings, wherein it is determined that the aircraft is marginally airworthy in response to determining that the payload-inclusive center of gravity exceeds the first center of gravity threshold and does not exceed the second center of gravity threshold. For example, although the aircraft is permitted to fly, the pilot may not be able to have as much autonomy or freedom. For example, with an off-center center of gravity, it may be judicious and/or safer to reduce some maximum attitude (e.g., angled and/or tilted position) at which the aircraft can fly at.

Returning briefly to FIG. 1, in some embodiments, the flight-time variable is an environmental and/or weather-related variable and/or measurement. The following figure describes some examples of how such information may be obtained.

Figure 9:
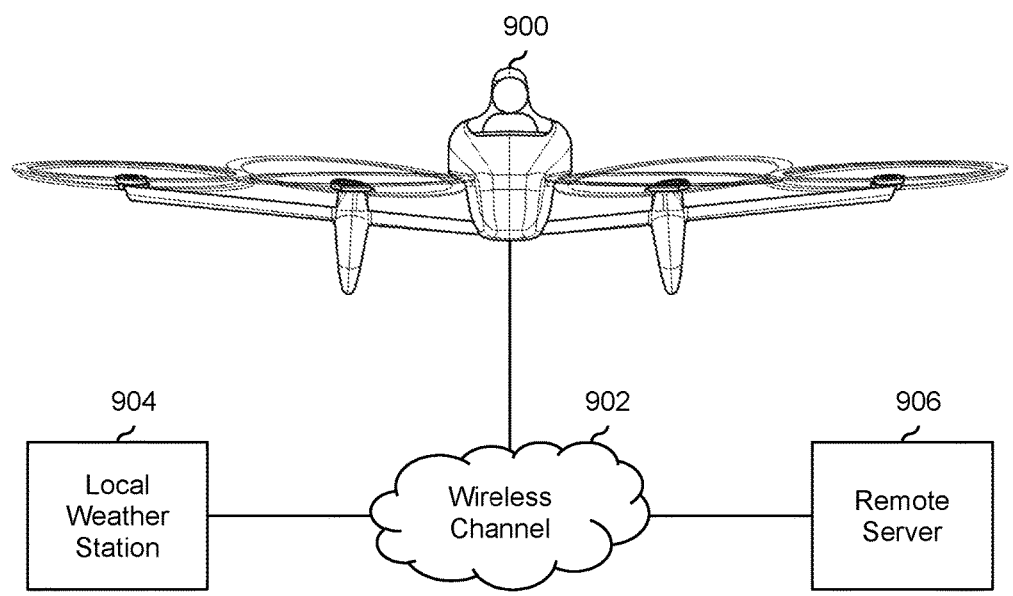
FIG. 9 is a diagram illustrating an embodiment of various devices from which environmental information is obtained.

FIG. 9 is a diagram illustrating an embodiment of various devices from which environmental information is obtained. In the example shown, environmental information including (but not limited to) weather information such as an amount of precipitation, temperature, wind speed, and air density is obtained.

In some embodiments, the aircraft (900) communicates with a local weather station (904) over a wireless channel (902) and obtains the environmental information from the local weather station. For example, if there is a popular location where pilots come to fly their aircraft (e.g., some open field, a lake, an airport, etc.), it may be worthwhile to install a local weather station at that location that can measure precipitation, temperature, wind speed, air density, etc. so that local and accurate weather information can be provided to the aircraft there.

Local weather stations may also be attractive and/or desirable in locations where weather conditions can change quickly and/or there are microclimates. For example, even within the city of San Francisco (which is relatively small), the weather on the western side of the city can vary greatly from the weather on the eastern side of the city. A local weather station may be able to provide more accurate weather information than other techniques.

In some embodiments, the aircraft (900) communicates with the local weather station (904) over a wireless channel (902) with a limited distance (e.g., radio, WiFi, etc.). By using a limited distance communication technology, it is not necessary for the aircraft to provide a location or position since the aircraft must be located relatively close to the local weather station in order for the local weather station to communicate with the aircraft. This also helps to ensure that the aircraft obtains relevant and/or accurate environmental information from a nearby (and therefore relevant and/or accurate) weather station.

In some embodiments (e.g., if there is no local weather station at the takeoff location), a remote server (906) may be contacted via the wireless channel (902) in order to obtain weather information at or associated with the aircraft's location. For example, the aircraft (900) may have a GPS system (not shown) and provide the remote server (906) with its GPS location. From the GPS location, the remote server make look up or otherwise obtain weather information for and/or based on that GPS location and return it to the aircraft.

In some embodiments, the weather information is used to estimate a flight-time variable (e.g., in step 100a in FIG. 4 and/or in step 100b in FIG. 5). For example, as described above, in some embodiments, a payload-inclusive weight is determined or otherwise estimated using wind speed to account for how the wind affects the thrust so that the weight estimation is more accurate. In some embodiments, the weather information is used as the flight-time variable itself. For example, it may be unsafe to fly at certain temperatures, wind speeds, and/or air densities. In some embodiments, an airworthiness check is performed using weather information.

In the examples described above, the weather information is obtained using wireless communication modules or blocks (e.g., radio, WiFi, cellular data networks such as 4G, 4G LTE, etc.) and/or position locators (e.g., a GPS module or block). These modules or blocks are used for a variety of purposes (e.g., navigation, communication, etc.) and are already included in the aircraft and as such there is no need to add new and/or additional devices or components. In contrast, some other types of aircraft may include weather measuring and/or monitoring equipment (e.g., wind sensors to measure wind speed) which add to the weight of the aircraft. As described above, for ultralight aircraft, the weight restrictions are very stringent and so being able to reuse existing equipment is very desirable.

In some embodiments, environmental information is obtained through other techniques. For example, since the exemplary aircraft has rotors which cut through the air, in some embodiments, the air density is estimated using information associated with the rotors such as thrust (e.g., represented by an amount of current fed into each of the rotors) and/or the rotational speed of the rotors. In general, low air density manifests itself exactly like a heavier pilot. Thus, a 190 lb. person may "look" to the thrust estimator like a 200 lb. person when flying at altitude. From a safety perspective, this "perceived" weight is of interest, not the true weight of the pilot. Therefore, although it may not be possible to measure the air density directly, protection against the effects due to low air density can be achieved by estimating the "perceived" weight of the pilot.

The following flowcharts describe the examples above more generally and/or formally.

Figure 10:
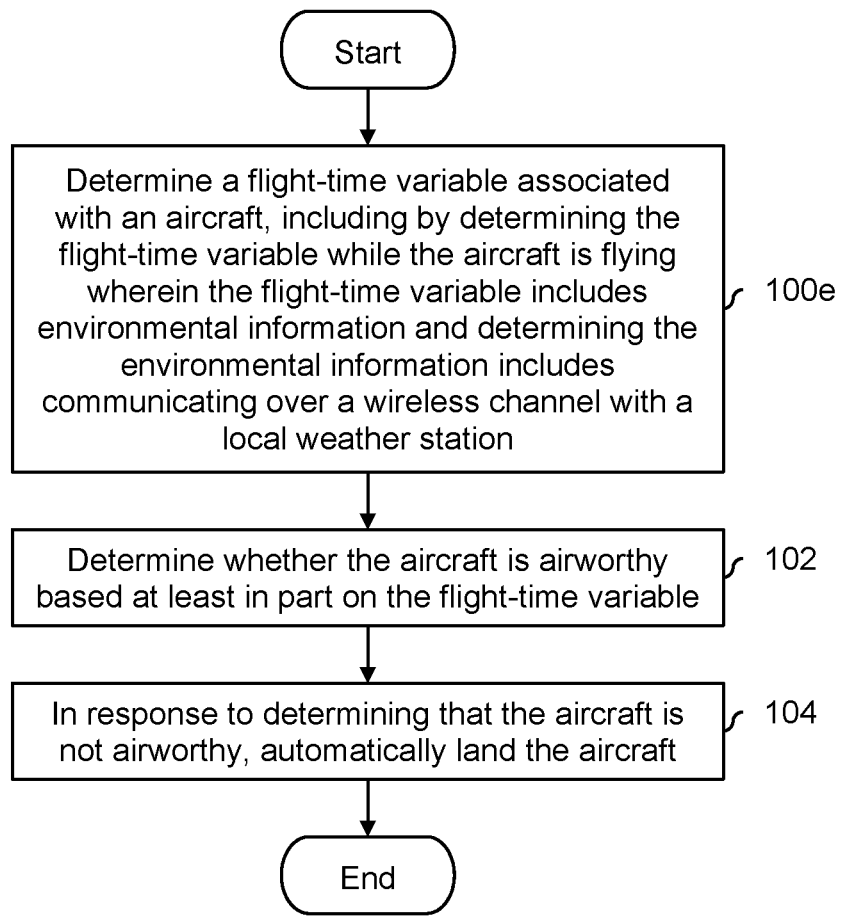
FIG. 10 is a flowchart illustrating an embodiment of a process to determine whether an aircraft is airworthy based at least in part on environmental information obtained from a local weather station.

FIG. 10 is a flowchart illustrating an embodiment of a process to determine whether an aircraft is airworthy based at least in part on environmental information obtained from a local weather station. FIG. 10 is related to FIG. 1 and for convenience the same or similar reference numbers are used to indicate related steps.

At 100e, a flight-time variable associated with an aircraft is determined, including by determining the flight-time variable while the aircraft is flying wherein the flight-time variable includes environmental information and determining the environmental information includes communicating over a wireless channel with a local weather station. For example, in FIG. 9, the aircraft (900) communicates with local weather station 904 over wireless channel (902). In various embodiments, the local weather station may include equipment to measure rainfall, the temperature, wind speed, atmospheric pressure, and/or air density so that corresponding measurements may be provided to the aircraft. As described above, the wireless channel may be a short-range communication technology.

At 102, it is determined whether the aircraft is airworthy based at least in part on the flight-time variable. For example, for safety and/or comfort, the aircraft may not be permitted to fly if it is raining, too hot/cold, too windy, atmospheric pressure is too low (e.g., possibly indicative of an incoming storm), air density is too low (e.g., rotors have to work harder to stay airborne, which depletes batteries faster and/or can demagnetize the magnets in the rotors if they are drawing too much current for too long of a (e.g., sustained) time) etc.

In some embodiments, this decision at step 102 is a binary decision. As described above, in some other embodiments, there may be multiple ranges of values against which the environmental information is compared, each with an associated degree or level of airworthiness (e.g., not airworthy, marginally airworthy, completely airworthy, etc.).

At 104, in response to determining that the aircraft is not airworthy, the aircraft automatically lands.

Figure 11:
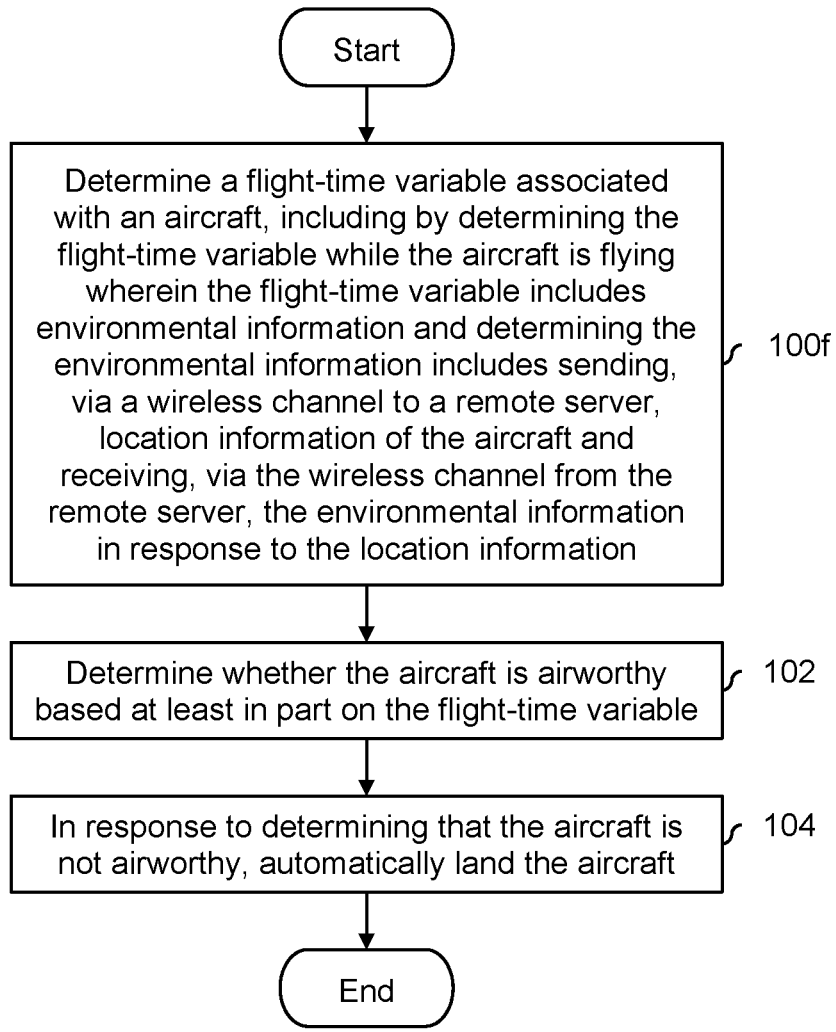
FIG. 11 is a flowchart illustrating an embodiment of a process to determine whether an aircraft is airworthy based at least in part on environmental information obtained from a remote server.

FIG. 11 is a flowchart illustrating an embodiment of a process to determine whether an aircraft is airworthy based at least in part on environmental information obtained from a remote server. FIG. 11 is related to FIG. 1 and for convenience the same or similar reference numbers are used to indicate related steps.

At 100f, a flight-time variable associated with an aircraft is determined, including by determining the flight-time variable while the aircraft is flying wherein the flight-time variable includes environmental information and determining the environmental information includes sending, via a wireless channel to a remote server, location information of the aircraft and receiving, via the wireless channel from the remote server, the environmental information in response to the location information. See, for example, remote server 906 which returns environmental information to aircraft 900 based on the provided GPS location information.

At 102, it is determined whether the aircraft is airworthy based at least in part on the flight-time variable.

At 104, in response to determining that the aircraft is not airworthy, the aircraft automatically lands.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
   a processor; and
   a memory coupled with the processor, wherein the memory is configured to provide the processor with instructions which when executed cause the processor to:
      determine a flight-time variable associated with an aircraft including by determining the flight-time variable while the aircraft is flying, wherein the flight-time variable includes a payload-inclusive weight determined by obtaining a thrust associated with a rotor while the aircraft is flying and determining the payload-inclusive weight based at least in part on the thrust;
      determine whether the aircraft is airworthy based at least in part on the flight-time variable including by:
         comparing the payload-inclusive weight to a first weight threshold; and
         comparing the payload-inclusive weight to a second weight threshold,
      wherein the first weight threshold is less than the second weight threshold;
      in response to determining that the aircraft is not airworthy, automatically land the aircraft in response to determining that the payload-inclusive weight exceeds the second weight threshold; and
      in response to determining that the aircraft is marginally airworthy, configure the aircraft with a set of one or more constrained settings, wherein it is determined that the aircraft is marginally airworthy in response to determining that the payload-inclusive weight exceeds the first weight threshold and does not exceed the second weight threshold.

2. The system recited in claim 1, wherein the flight-time variable further includes one or more of the following: a center of mass of the aircraft when occupied, environmental information, weather information, an amount of precipitation, a temperature, a wind speed, or an air density.

3. The system recited in claim 1, wherein:
determining whether the aircraft is airworthy includes:
  determining that the aircraft is marginally airworthy in response to determining that the flight-time variable exceeds the first weight threshold and does not exceed the second weight threshold; and
  determining that the aircraft is not airworthy in response to determining that the flight-time variable exceeds the second weight threshold;
and
the memory is further configured to provide the processor with instructions which when executed cause the processor to: in response to determining that the aircraft is marginally airworthy, configure the aircraft with a set of one or more constrained settings.

4. The system recited in claim 1, wherein:
the flight-time variable further includes environmental information; and
determining the environmental information includes communicating over a wireless channel with a local weather station.

5. The system recited in claim 1, wherein:
the flight-time variable further includes environmental information; and
determining the environmental information includes sending, via a wireless channel to a remote server, location information of the aircraft and receiving, via the wireless channel from the remote server, the environmental information in response to the location information.

6. A system comprising:
a processor; and
a memory coupled with the processor, wherein the memory is configured to provide the processor with instructions which when executed cause the processor to:
  determine a flight-time variable associated with an aircraft including by determining the flight-time variable while the aircraft is flying, wherein the flight-time variable includes a payload-inclusive center of gravity determined by obtaining a thrust associated with a rotor while the aircraft is flying and determining the payload-inclusive center of gravity based at least in part on the thrust,
  determine whether the aircraft is airworthy based at least in part on the flight-time variable including by:
    comparing the payload-inclusive center of gravity to a first center of gravity threshold represented by a first three-dimensional (3D) shape, and
    comparing the payload-inclusive center of gravity to a second center of gravity threshold represented by a second 3D shape, wherein the first center of gravity threshold is less than the second center of gravity threshold;
  in response to determining that the aircraft is not airworthy, automatically land the aircraft in response to determining that the payload-inclusive center of gravity exceeds the second center of gravity threshold;
  in response to determining that the aircraft is marginally airworthy, configure the aircraft with a set of one or more reduced settings, wherein it is determined that the aircraft is marginally airworthy in response to determining that the payload-inclusive center of gravity exceeds the first center of gravity threshold and does not exceed the second center of gravity threshold.

7. The system recited in claim 6, wherein the flight-time variable further includes one or more of the following: a center of mass of the aircraft when occupied, environmental information, weather information, an amount of precipitation, a temperature, a wind speed, or an air density.

8. The system recited in claim 6, wherein:
determining whether the aircraft is airworthy includes:
  determining that the aircraft is marginally airworthy in response to determining that the flight-time variable exceeds the first weight threshold and does not exceed the second weight threshold; and
  determining that the aircraft is not airworthy in response to determining that the flight-time variable exceeds the second weight threshold; and
the memory is further configured to provide the processor with instructions which when executed cause the processor to: in response to determining that the aircraft is marginally airworthy, configure the aircraft with a set of one or more constrained settings.

9. The system recited in claim 6, wherein:
the flight-time variable further includes environmental information; and
determining the environmental information includes communicating over a wireless channel with a local weather station.

10. The system recited in claim 6, wherein:
the flight-time variable further includes environmental information; and
determining the environmental information includes sending, via a wireless channel to a remote server, location information of the aircraft and receiving, via the wireless channel from the remote server, the environmental information in response to the location information.

11. A method comprising:
determining a flight-time variable associated with an aircraft, including by determining the flight-time variable while the aircraft is flying, wherein the flight-time variable includes a payload-inclusive weight determined by obtaining a thrust associated with a rotor while the aircraft is flying and determining the payload-inclusive weight based at least in part on the thrust;
determining whether the aircraft is airworthy based at least in part on the flight-time variable including by:
  comparing the payload-inclusive weight to a first weight threshold; and
  comparing the payload-inclusive weight to a second weight threshold, wherein the first weight threshold is less than the second weight threshold;
in response to determining that the aircraft is not airworthy, automatically landing the aircraft in response to determining that the payload-inclusive weight exceeds the second weight threshold; and
in response to determining that the aircraft is marginally airworthy, configuring the aircraft with a set of one or more constrained settings, wherein it is determined that the aircraft is marginally airworthy in response to determining that the payload-inclusive weight exceeds the first weight threshold and does not exceed the second weight threshold.

12. The method recited in claim 11, wherein:
determining whether the aircraft is airworthy includes:
  determining that the aircraft is marginally airworthy in response to determining that the flight-time variable exceeds the first threshold and does not exceed the second threshold; and
  determining that the aircraft is not airworthy in response to determining that the flight-time variable exceeds the second threshold;
and
the method further includes: in response to determining that the aircraft is marginally airworthy, configure the aircraft with a set of one or more constrained settings.

13. The method recited in claim 11, wherein the flight-time variable further includes one or more of the following: a center of mass of the aircraft when occupied, environmental information, weather information, an amount of precipitation, a temperature, a wind speed, or an air density.

14. The method recited in claim 11, wherein:
the flight-time variable further includes environmental information; and
determining the environmental information includes communicating over a wireless channel with a local weather station.

15. The method recited in claim 11, wherein:
the flight-time variable further includes environmental information; and
determining the environmental information includes sending, via a wireless channel to a remote server, location information of the aircraft and receiving, via the wireless channel from the remote server, the environmental information in response to the location information.

16. A method comprising:
determining a flight-time variable associated with an aircraft, including by determining the flight-time variable while the aircraft is flying, wherein the flight-time variable includes a payload-inclusive center of gravity determined by:
  obtaining a thrust associated with a rotor while the aircraft is flying; and
  determining the payload-inclusive center of gravity based at least in part on the thrust;
determining whether the aircraft is airworthy based at least in part on the flight-time variable including by:
  comparing the payload-inclusive center of gravity to a first center of gravity threshold represented by a first three-dimensional (3D) shape; and
  comparing the payload-inclusive center of gravity to a second center of gravity threshold represented by a second 3D shape, wherein the first center of gravity threshold is less than the second center of gravity threshold;
in response to determining that the aircraft is not airworthy, automatically landing the aircraft in response to determining that the payload-inclusive center of gravity exceeds the second center of gravity threshold; and
in response to determining that the aircraft is marginally airworthy, configuring the aircraft with a set of one or more reduced settings, wherein it is determined that the aircraft is marginally airworthy in response to determining that the payload-inclusive center of gravity exceeds the first center of gravity threshold and does not exceed the second center of gravity threshold.

17. The method recited in claim 16, wherein the flight-time variable further includes one or more of the following: a center of mass of the aircraft when occupied, environmental information, weather information, an amount of precipitation, a temperature, a wind speed, or an air density.

18. The method recited in claim 16, wherein:
determining whether the aircraft is airworthy includes:
  determining that the aircraft is marginally airworthy in response to determining that the flight-time variable exceeds the first threshold and does not exceed the second threshold; and
  determining that the aircraft is not airworthy in response to determining that the flight-time variable exceeds the second threshold; and
the method further includes: in response to determining that the aircraft is marginally airworthy, configure the aircraft with a set of one or more constrained settings.

19. The method recited in claim 16, wherein:
the flight-time variable further includes environmental information; and
determining the environmental information includes communicating over a wireless channel with a local weather station.

20. The method recited in claim 16, wherein:
the flight-time variable further includes environmental information; and
determining the environmental information includes sending, via a wireless channel to a remote server, location information of the aircraft and receiving, via the wireless channel from the remote server, the environmental information in response to the location information.

21. A computer program product, the computer program product being embodied in a non-transitory computer readable storage medium and comprising computer instructions for:
determining a flight-time variable associated with an aircraft, including by determining the flight-time variable while the aircraft is flying, wherein the flight-time variable includes a payload-inclusive weight determined by obtaining a thrust associated with a rotor while the aircraft is flying and determining the payload-inclusive weight based at least in part on the thrust;
determining whether the aircraft is airworthy based at least in part on the flight-time variable including by:
  comparing the payload-inclusive weight to a first weight threshold; and
  comparing the payload-inclusive weight to a second weight threshold, wherein the first weight threshold is less than the second weight threshold;
in response to determining that the aircraft is not airworthy, automatically landing the aircraft in response to determining that the payload-inclusive weight exceeds the second weight threshold; and
in response to determining that the aircraft is marginally airworthy, configure the aircraft with a set of one or more constrained settings, wherein it is determined that the aircraft is marginally airworthy in response to determining that the payload-inclusive weight exceeds the first weight threshold and does not exceed the second weight threshold.

22. A computer program product, the computer program product being embodied in a non-transitory computer readable storage medium and comprising computer instructions for:
determining a flight-time variable associated with an aircraft, including by determining the flight-time variable while the aircraft is flying, wherein the flight-time variable includes a payload-inclusive center of gravity determined by obtaining a thrust associated with a rotor while the aircraft is flying and determining the payload-inclusive center of gravity based at least in part on the thrust;

determining whether the aircraft is airworthy based at least in part on the flight-time variable including by:

comparing the payload-inclusive center of gravity to a first center of gravity threshold represented by a first three-dimensional (3D) shape, and comparing the payload-inclusive center of gravity to a second center of gravity threshold represented by a second 3D shape, wherein the first center of gravity threshold is less than the second center of gravity threshold in response to determining that the aircraft is not airworthy, automatically landing the aircraft in response to determining that the payload-inclusive center of gravity exceeds the second center of gravity threshold; and in response to determining that the aircraft is marginally airworthy, configuring the aircraft with a set of one or more reduced settings, wherein it is determined that the aircraft is marginally airworthy in response to determining that the payload-inclusive center of gravity exceeds the first center of gravity threshold and does not exceed the second center of gravity threshold.

* * * * *